(12) United States Patent
Stettler

(10) Patent No.: US 7,021,645 B1
(45) Date of Patent: Apr. 4, 2006

(54) PIVOTING HITCH SYSTEM FOR TRAILER

(75) Inventor: Dana Stettler, Corona, CA (US)

(73) Assignee: Pivit Hitch, Inc., Riverside, CA (US)

(*) Notice: Subject to any disclaimer, the term of this patent is extended or adjusted under 35 U.S.C. 154(b) by 130 days.

(21) Appl. No.: 10/382,072

(22) Filed: Mar. 5, 2003

Related U.S. Application Data

(60) Provisional application No. 60/361,868, filed on Mar. 5, 2002.

(51) Int. Cl.
*B60D 1/155* (2006.01)
*B60P 3/10* (2006.01)

(52) U.S. Cl. .............................. 280/491.4; 280/491.1; 280/414.1

(58) Field of Classification Search ............ 280/414.1, 280/482, 491.1, 491.3, 491.4
See application file for complete search history.

(56) References Cited

U.S. PATENT DOCUMENTS

| | | | |
|---|---|---|---|
| 3,979,138 A * | 9/1976 | George et al. ........... | 280/478.1 |
| 4,398,742 A * | 8/1983 | Sanders ................... | 280/491.3 |
| 5,503,423 A * | 4/1996 | Roberts et al. .......... | 280/491.3 |
| 5,890,617 A * | 4/1999 | Rowland et al. ......... | 280/491.3 |
| 5,992,871 A * | 11/1999 | Rowland et al. ......... | 280/491.3 |
| 6,364,337 B1 * | 4/2002 | Rowland et al. ......... | 280/491.3 |
| 6,527,292 B1 * | 3/2003 | Adair ...................... | 280/491.3 |
| 6,595,540 B1 * | 7/2003 | MacKarvich ............ | 280/491.3 |
| 2003/0141698 A1 * | 7/2003 | MacKarvich ............ | 280/491.3 |

* cited by examiner

*Primary Examiner*—Lesley D. Morris
*Assistant Examiner*—Matthew Luby
(74) *Attorney, Agent, or Firm*—Fish & Richardson P.C.; Fred C. Hernandez; Mikael Havlucivan

(57) ABSTRACT

Disclosed is a trailer hitch system that is configured to rotate to a stowing position and an operating position. When in the operational position, a coupler arm of the trailer is aligned with the longitudinal axis of the trailer so that the coupler arm contributes to the length of the trailer. When in the stowing position, the coupler arm of the trailer is bent at an angle relative to the longitudinal axis of the trailer so that the coupling arm does not contribute to the overall length of the trailer.

15 Claims, 13 Drawing Sheets

PIVOTING HITCH SYSTEM FOR TRAILER

REFERENCE TO PRIORITY DOCUMENT

This application claims priority of co-pending U.S. Provisional Patent Application Ser. No. 60/361,868 entitled "Pivoting Hitch System for Trailer" by D. Stettler, filed Mar. 5, 2002. Priority of the filing date of Mar. 5, 2002 is hereby claimed, and the disclosure of the Provisional Patent Application is hereby incorporated by reference.

BACKGROUND OF THE INVENTION

1. Field of the Invention

The present invention relates to boat trailers. More particularly, the present invention relates to a rotating trailer hitch for a boat trailer.

2. Description of the Related Art

For towing purposes, user of boats will position the boat atop a boat trailer during transport of the boat. The boat trailer typically includes a main, support section that is sized to support the entire boat. Thus, the support section is typically at least as long as the entire length of the boat. A towing arm typically extends forwardly from the support section such that the towing arm increases the overall length of the trailer. The towing arm can be attached to a towing vehicle using a hitch. Due to the size requirements of the support section and the towing arm, the boat trailer is usually longer than the boat that it carries. As a result, storing certain sized boats and their trailers in a confined space, such as in the boat owner's garage, can be difficult, if not impossible. This storage constraint often forces some people to buy smaller boats, as they do not have access to storage space that is large enough to contain the large trailer.

On the other hand, many boaters have a near fanatical devotion to their sport and refuse to sacrifice the size of the boat in order to accommodate a small storage space. Consequently, some boaters resort to expensive and time consuming measures in order to store a boat of a desired size. For example, some boaters have been known to enlarge the sizes of their garage spaces in order to create sufficient room to store boats indoors.

Other boaters may purchase specialized boat trailers where the front of the trailer, specifically the front towing arm area, can be adjusted in size to fit within small areas. There currently exist trailers with hinged towing arms that swing out of the way to a stowing position when not in use, so that the towing arm does not increase the overall length of the trailer when the trailer is in storage. Such devices use tubes that are welded or glued to the sides of a trailer front arm. The tubes are aligned with one or more holes on plates positioned on a rotating towing arm. A pin is then inserted into the tubes and the holes of the plates such that the pin acts as an axis of rotation to permit the towing arm to be rotated to the stowing position when not in use. The process of welding the tubes and plates to the towing arm and trailer arms can be time consuming, which can add to the overall manufacturing cost of the trailer. In addition, the welds between the tubes and the trailer arms can acts as a point of failure for the towing trailer if the welds are not strong enough to properly secure the tubes to the trailer.

In view of the foregoing, there is a need for an improved pivoting trailer hitch.

SUMMARY

Disclosed is a hitch system for a boat trailer, comprising a rotatable coupler arm that can be hitched to a towing vehicle. The coupler arm includes a first coupler knuckle integrally formed on a first side of the coupler arm, wherein an elongate first shaft extends through the first coupler knuckle. The hitch system further includes a trailer front arm attached to the boat trailer. The trailer front arm includes a first trailer knuckle integrally formed on a first side of the trailer front arm, wherein an elongate second shaft extends through the first trailer knuckle. The trailer arm is positioned relative to the coupler arm such that the first shaft in the first coupler knuckle co-axially aligns with the second shaft in the first trailer knuckle so that the first and second shafts collectively form a single, elongate rotator shaft. The rotator shaft is sized to receive a rotator pin. The coupler arm can rotate about the rotator pin when the rotator pin is positioned in the rotator shaft. Also disclosed is a boat trailer that includes the disclosed hitch system.

Other features and advantages of the present invention should be apparent from the following description of various embodiments, which illustrate, by way of example, the principles of the invention.

DETAILED DESCRIPTION

Figure 1:
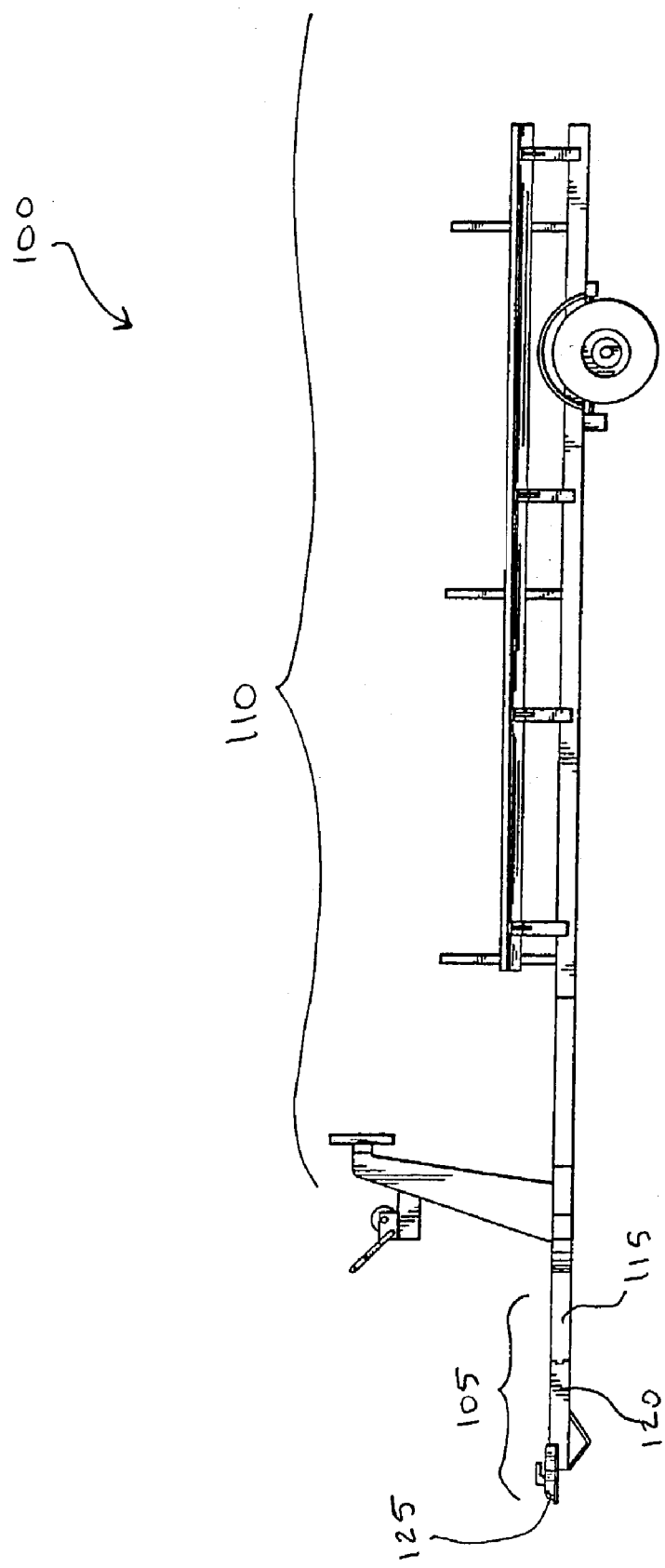
FIG. 1 shows a side view of a boat trailer that incorporates a trailer hitch system of the present invention.

FIG. 1 shows a side view of a boat trailer 100 that incorporates a trailer hitch system 105 of the present invention. A front end of the trailer 100 includes the trailer hitch system 105, which is configured to rotate to a stowing position and an operating position in accordance with one aspect of the invention, as described below. When in the operational position, a coupler arm of the trailer 100 is aligned with the longitudinal axis of the trailer so that the coupler arm contributes to the length of the trailer, as described in more detail below. When in the stowing position, the coupler arm of the trailer 100 is bent at an angle relative to the longitudinal axis of the trailer so that the coupling arm does not contribute to the overall length of the trailer 100.

The trailer 100 includes a support section 110 that is configured to support a boat in a well-known manner. The support section 110 generally comprises a frame that includes a plurality of interconnected trusses that are arranged to provide support to a boat. Those skilled in the art will appreciate that the support section 105 can have a variety of structural configurations that support a boat in any of a wide variety of manners.

With reference to FIG. 1, the trailer hitch system 105 includes an elongate trailer tongue or front arm 115 that extends forwardly from the support section 105 of the trailer 100. The front arm 115 is rotatably-attached to an elongate, rotatable coupler arm 120, as described more fully below. The coupler arm 120 has a front end on which is located a coupler device 125, such as a hitch, that can removably mate with a towing vehicle (not shown) in a well-known manner for towing the trailer 100. In one embodiment, at least a portion of the coupler arm 120 is a brake actuator cover that has an outer member and an inner member.

Figure 2:
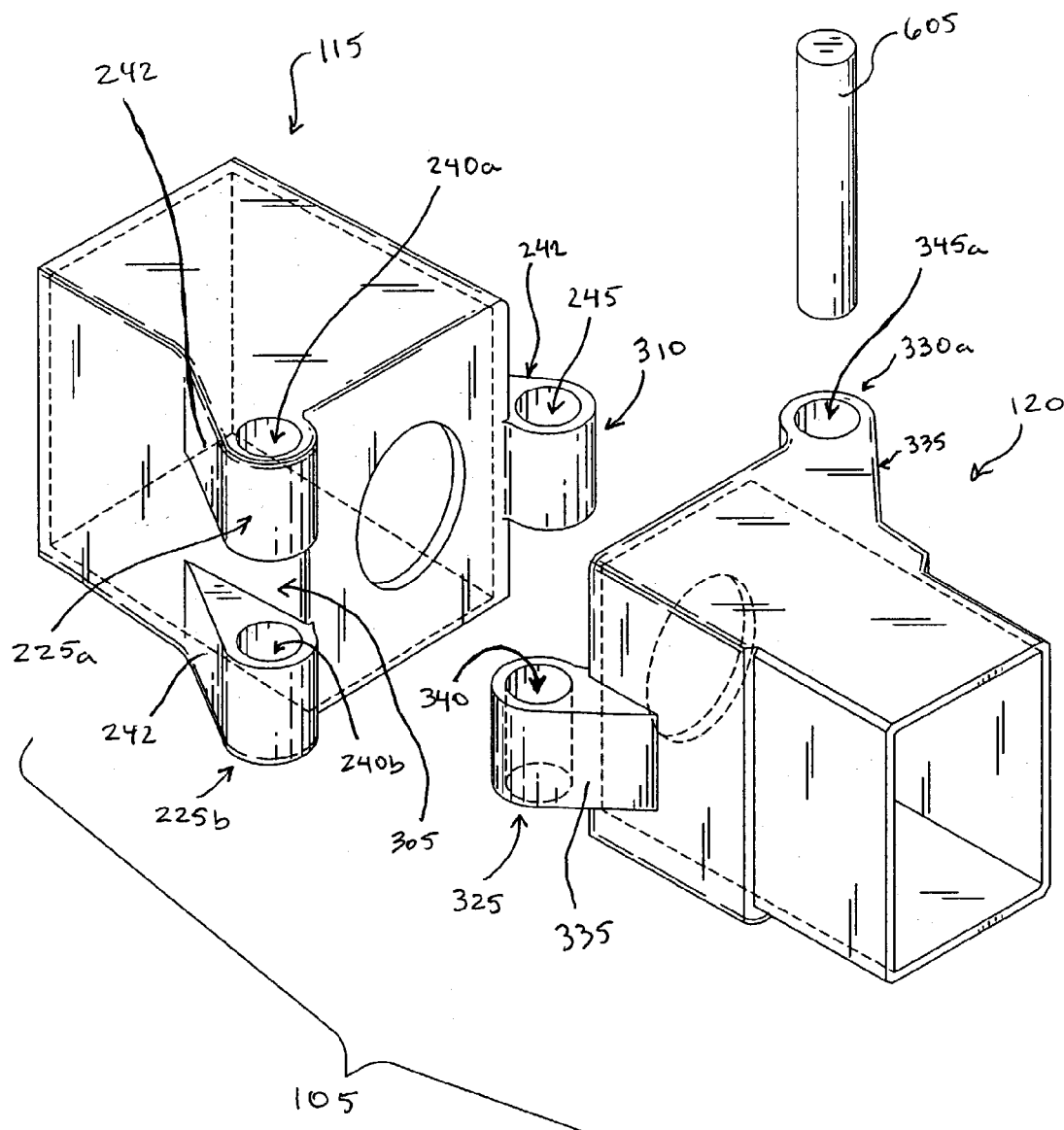
FIG. 2 shows a front, perspective, exploded view of the trailer hitch system.
Figure 3:
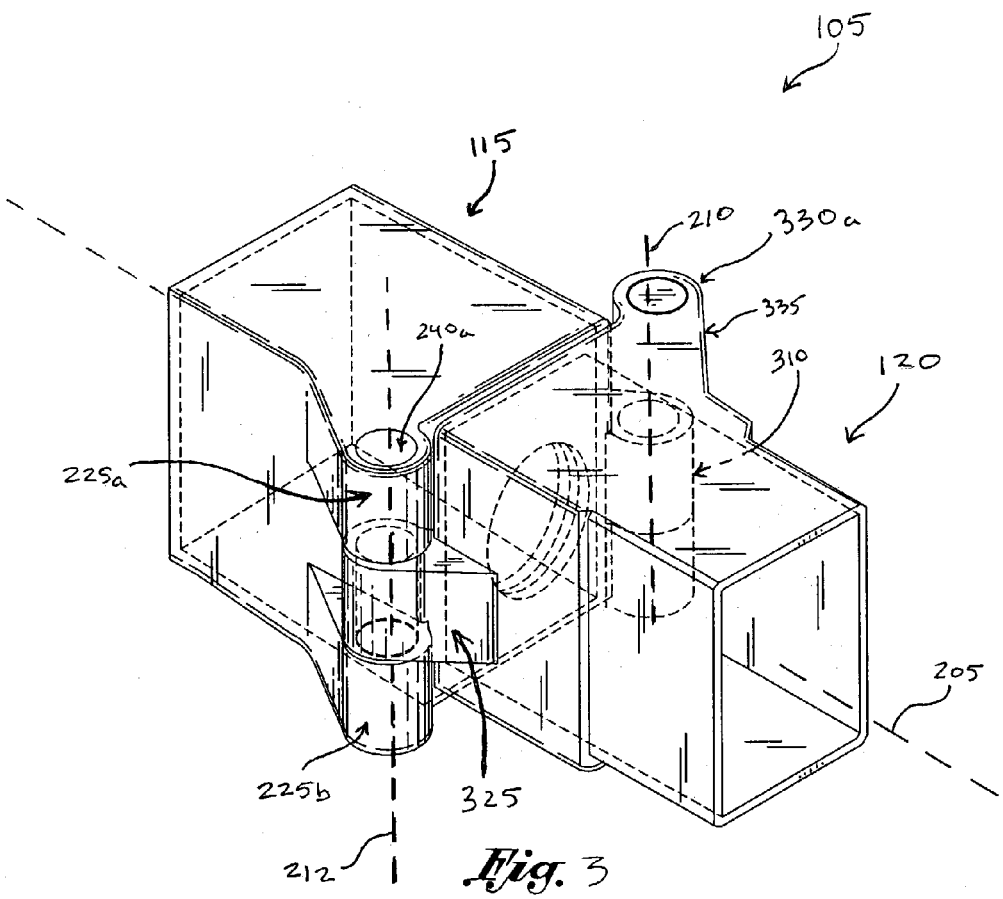
FIG. 3 is a front, perspective view of a section of the trailer hitch system in an operational state.
Figure 4:
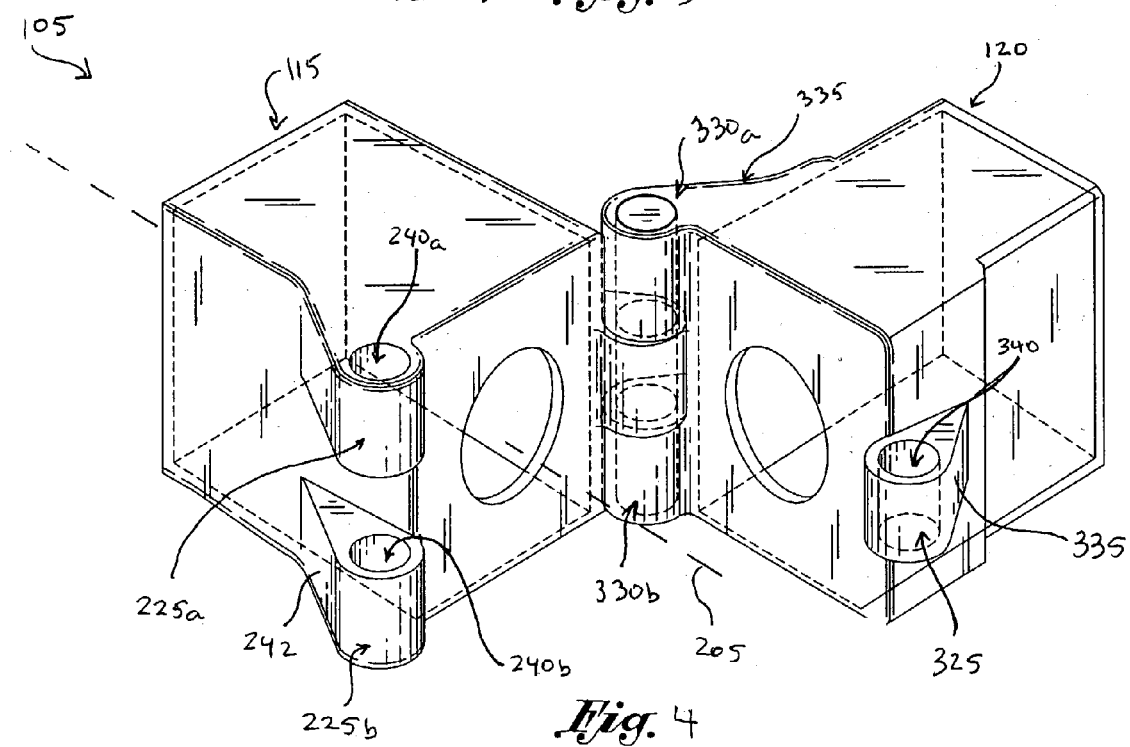
FIG. 4 is a front, perspective view of a section of the trailer hitch system in a stowing state.

FIG. 2 is a front, exploded, perspective view of a section of the hitch system 105. FIG. 3 is a front, perspective view of a section of the hitch system 105 in the operational state. FIG. 4 is a front, perspective view of a section of the hitch system 105 in the stowing state. For clarity of illustration, the coupler arm 120 is shown cut at a forward end and the trailer front arm 115 is shown cut at a rear end. It should be appreciated that the actual coupler arm 120 can extend forwardly and terminate at the coupler device 125 and that the actual trailer front arm 115 can extends rearwardly and connect to the support section 110 of the trailer 100, as shown in FIG. 1. Alternately, the hitch system can be as shown in FIGS. 2–4. In such a case, the trailer front arm portion of the hitch system can be attached to an actual trailer front arm, such as by using a weld or using bolts, and the coupler arm portion can be attached a coupler arm.

Figure 5:
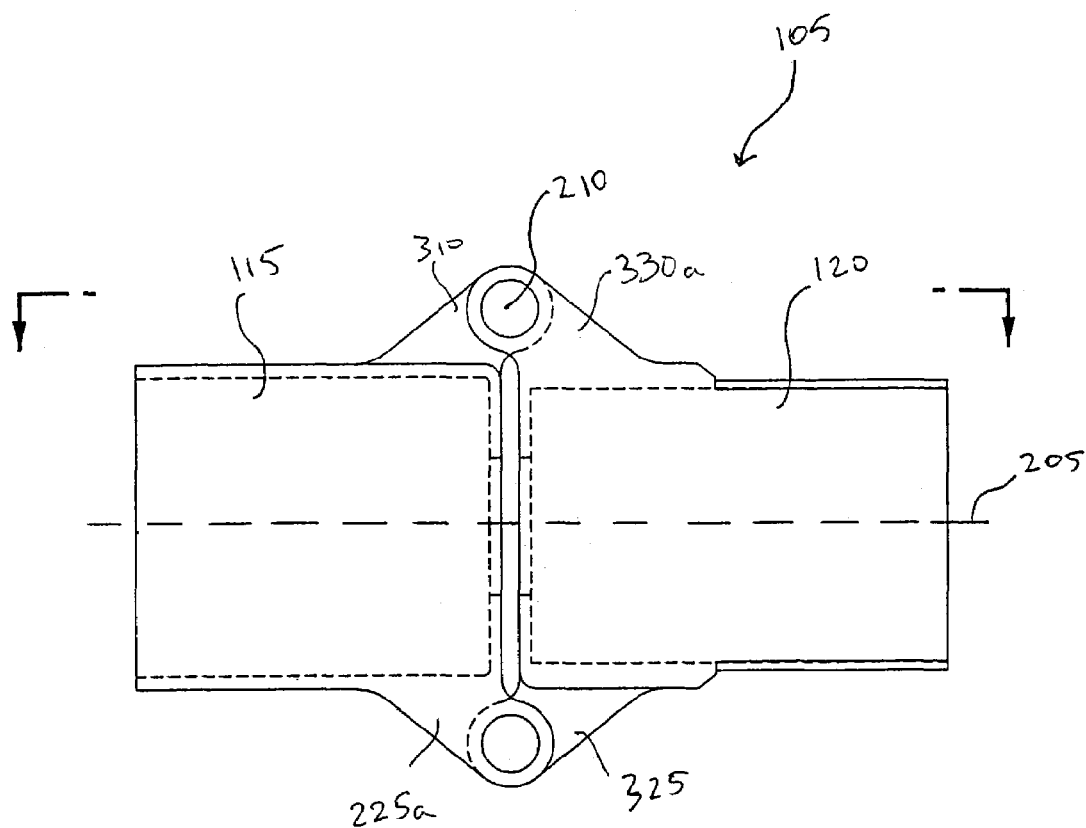
FIG. 5 is a top view of a section of the trailer hitch system in an operational state.
Figure 6:
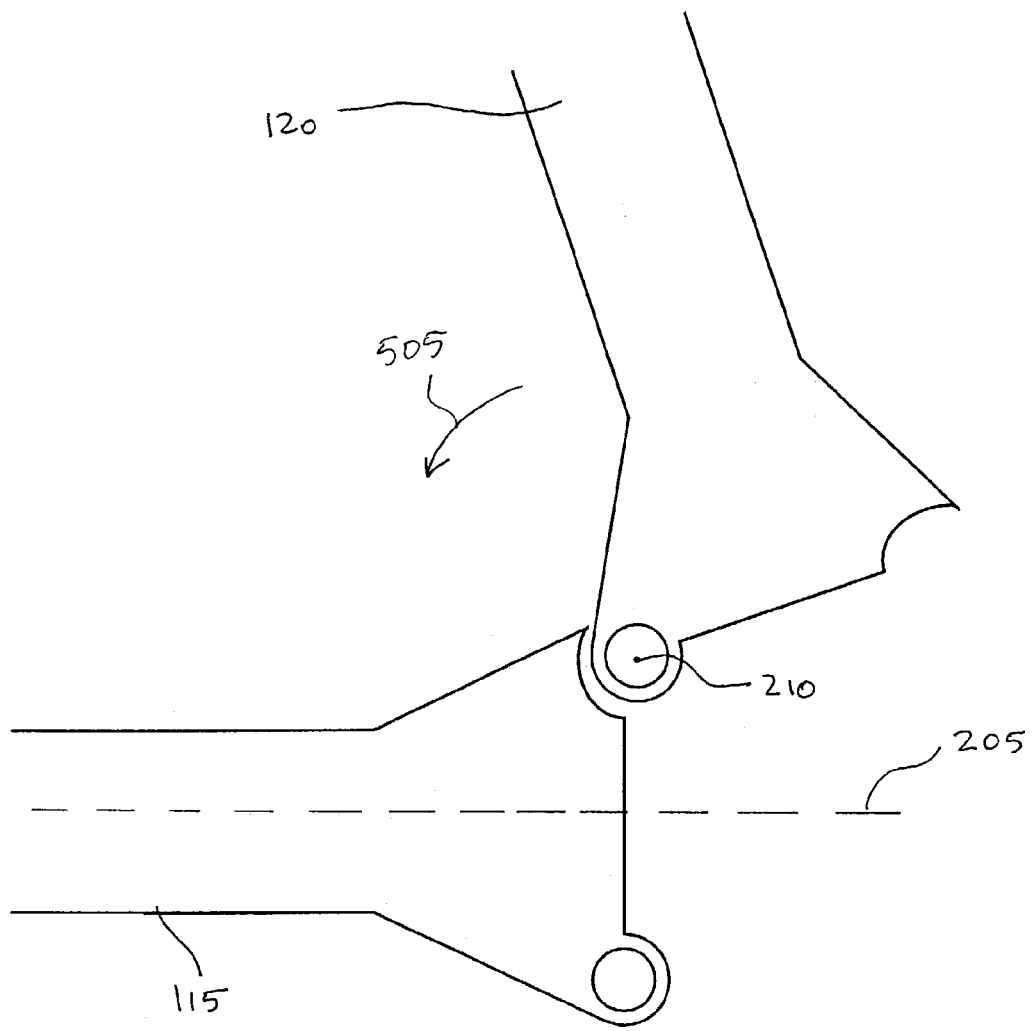
FIG. 6 is a top view of a section of the trailer hitch system in an stowing state.

The trailer hitch system 105 is configured such that the coupler arm 120 can rotatably move between an operating position (shown in perspective in FIG. 3 and top-down in FIG. 5) and a stowing position (shown in perspective in FIG. 4 and top-down in FIG. 6). In the operating position, as shown in FIG. 3 and FIG. 5, the coupler arm 120 and the trailer front arm 115 are substantially aligned so that they both extend along a common longitudinal axis 205 of the trailer 100. In the stowing position, as shown in FIG. 4 and FIG. 6, the elongate coupler arm 120 is oriented such that the longitudinal axis of the coupler arm 120 is transverse to the longitudinal axis 205 of the trailer 110. The coupler arm 120 is moved to the stowing position by rotating the coupler arm about an axis of rotation 210, as described more fully below. (The axis of rotation can also be located at the axis 212 of FIG. 3, depending on the positioning of a rotation pin, as described below).

With reference to FIGS. 2–4, the trailer front arm 115 includes an elongate main body that is shown having a substantially rectangular cross-sectional shape, although the trailer front arm 115 can have other cross-sectional shapes. The trailer front arm 115 has a frontward hinge portion. The hinge portion includes at least one trailer knuckle 225, the knuckle(s) comprising protrusions that extend outwardly from the hinge portion of the trailer front arm 115. The trailer knuckles 225 mates with corresponding coupler knuckle(s) 325 on the coupler arm 120 in order to enable the coupler arm 120 to rotate about the axis of rotation 210, as described below. The knuckles of the hitch system 105 are shown and described as having rounded outer shapes, which facilitates rotational movement of the coupler arm 120, although it should be appreciated that the outer shape of the knuckles can vary. As described further below, the quantity of trailer knuckles and coupler knuckles, as well as the relative positions and locations of the trailer knuckles and coupler knuckles, can vary.

In the embodiment shown in FIGS. 2–4, the trailer front arm 115 includes two left trailer knuckles 225*a*, 225*b* that are both located on a left side of the trailer front arm 115. Elongate, internal shafts 240*a*, 240*b* extend through the left knuckles 225*a*, 225*b*, respectively, as best shown in FIGS. 2–3. The elongate, internal shafts 240*a*, 240*b* extend through the knuckles 225*a*, 225*b* such that the shafts 240*a*, 240*b* are both co-axially aligned along a common axis 212 (shown in FIG. 3). The internal shafts 240*a*, 240*b* have rounded or circular contours, although it should be appreciated that the shafts can have other types of contours.

With reference to FIG. 2, each of the left trailer knuckles 225*a*, 225*b* are formed by a sloped surface 242 that slopes outwardly from a side surface of the trailer front arm 115. The sloped surfaces 242 of the trailer knuckles 225*a*, 225*b* transition into curved outer surfaces to provide the trailer knuckles 225*a*, 225*b* with a smooth, rounded shape that facilitates rotation of the coupler arm to the stowing position, as described below. The left trailer knuckles 225*a*, 225*b* are integrally formed with the trailer front arm 115 so that the trailer front arm 115 and trailer knuckles 225*a*, 225*b* comprise a single piece of material, rather than separate pieces of material for the trailer front arm 115 and the knuckles. Such an arrangement facilitates a secure structural arrangement that does not require any welds or adhesive to attach the knuckles to the arm.

With reference to FIG. 2, the left trailer knuckle 225*a* is located at or near a top edge of the trailer front arm 115 and the left trailer knuckle 225*b* is located at or near a bottom edge of the trailer front arm 115 so that the left trailer knuckles 225*a* and 225*b* define a space 305 therebetween. Thus, the internal shafts 240*a*, 240*b* have a gap therebetween, the size of the gap being defined by the size of the space 305 between the top, left trailer knuckle 225*a* and the bottom, left trailer knuckle 225*b*.

With reference still to FIG. 2, the trailer front arm 115 also includes at least one right trailer knuckle 310 that is disposed on a right side of the trailer front arm 115. The right trailer knuckle 310 is located centrally on the right side of the of the trailer front arm 115. That is, the right trailer knuckle 310 is not located on the top or bottom edge of the trailer front arm 115, although in other embodiments, the position of the right trailer knuckle 310 can be varied, as described below. An internal shaft 245 extends through the trailer right knuckle 310, wherein the internal shaft 245 axially aligns with an internal shaft of corresponding coupler knuckles on the coupler arm 120 when the coupler arm is mated with the trailer front arm, as described below.

With reference to FIGS. 2 and 4, the coupler arm 120 includes an elongate main body. The coupler arm 120 has a rearward hinge portion that is located adjacent the hinge portion of the trailer front arm 115. The coupler arm 120 includes at least one coupler knuckle, such as one or more left coupler knuckles 325 and one or more right coupler knuckles 330. As discussed above with reference to the trailer knuckles, the coupler knuckles 325, 330 comprise protrusions that extend outwardly from the hinge portion of the coupler arm 120. The coupler knuckles are formed by sloped surfaces 335 that slope outwardly from a respective side surface of the coupler arm 120. The sloped surfaces 335 of the coupler knuckles 325 transition into curved outer surfaces to provide the coupler knuckles 325 with smooth, rounded shapes that substantially mirror the shapes of the trailer knuckles 225.

As mentioned, the quantity of coupler knuckles and the positions of the coupler knuckles relative to one another and the trailer knuckles can vary. In the embodiment shown in FIGS. 2–4, the coupler arm 120 includes a single left coupler knuckle 325 that is centrally located on the left, rear side of the coupler arm. An elongate, internal shaft 340 (shown in FIGS. 2 and 4) extends through the left coupler knuckle. The left coupler knuckle 325 has a size and shape that permits the left coupler knuckle 325 to fit within the space 305 that is located between the left trailer knuckles 225*a*, 225*b*.

As shown in FIG. 3 (and schematically in FIG. 8), when the coupler arm 120 is in the operating position, the left coupler knuckle 325 is positioned within the space 305 between the left trailer knuckles 225*a*, 225*b* such that the internal shaft 340 of the left coupler knuckle 325 co-axially aligns with the internal shafts 240*a*, 240*b* of the left trailer knuckles 325*a*, 325*b*. Thus, the elongate shafts 240*a*, 240*b* of the trailer knuckles 225*a*, 225*b* and the elongate shaft 340 of the left coupler knuckle 325 collectively form a single, elongate shaft that can receive a pin, as described below. The single, elongate shaft formed by the shafts 240*a*, 240*b*, and 340 defines the axis 212 (shown in FIG. 3).

With reference again to FIGS. 2 and 4, the coupler arm 120 further includes at least one right coupler knuckle 330 located on the right side of the coupler arm. In the illustrated embodiment, there are two right coupler knuckles 330, including a right coupler knuckle 330*a* located at or near a top edge of the coupler arm 120, and a right coupler knuckle 330*b* located at or near a bottom edge of the coupler arm 120. The right coupler knuckles 330*a*, 330*b* each has an elongate, internal shaft 345*a*, 345*b*, respectively, (shown in FIG. 7). The internal shafts 345*a*, 345*b* are co-axially aligned with one another. Additionally, the elongate, internal shafts 345*a*, 345*b* define the axis of rotation 212 of the coupler arm 120.

As shown in FIG. 4 (also shown schematically in FIG. 7), the right coupler knuckle 330*a* and the right coupler knuckle 330*b* define a space therebetween, wherein the space is sized to receive the right trailer knuckle 310 when the coupler arm 120 is mated with the trailer front arm 115. When the right trailer knuckle 310 is positioned within the space between the right coupler knuckles 330*a*, 330*b*, the elongate, internal shafts 345*a*, 345*b* of the right coupler knuckles 330*a*, 330*b* are coaxially aligned with the internal shaft 245 of the right trailer knuckle 310. Thus, the elongate shafts 345*a*, 345*b* of the right coupler knuckles 330*a*, 330*b* and the elongate shaft of the right trailer knuckle 310 collectively form a single, elongate rotator shaft that is aligned with the axis of rotation 210. As described below, a rotator pin 605 can be inserted into this shaft to retain the coupler arm 120 to the trailer front arm 115.

As mentioned, the knuckles are integrally formed with their respective arms such that the arms and knuckles comprise a single piece of material, rather than separate pieces of material for the arm and the knuckles. For example, the trailer knuckles are integrally formed with the trailer front arm 115 so that the trailer front arm 115 and the various trailer knuckles are formed of a unitary piece of material. Likewise, the coupler knuckles are integrally formed with the coupler arm 120 so that the coupler arm 120 and the various coupler knuckles are formed of a unitary piece of material. Such an arrangement facilitates a secure structure that does not require any welds or adhesive to attach the knuckles to the respective arms. In one embodiment, the coupler arm and the coupler knuckles are manufactured by molding the coupler arms and the coupler knuckles using a mold, such as by an injection molding process. Where a mold is used, the entire hinge portions of the trailer front arm (including the trailer knuckles and at least a portion of the trailer front arm) can be injection molded as a single piece. The coupler arm of the hitch system can be similarly manufactured. In one embodiment, the hitch system 105 is manufactured of steel, such as a cast steel, stainless steel, or a mild steel. Other materials can also be used to manufacture the hitch system.

FIG. 5 shows a top view of the hitch system 105 with the coupler arm 120 in the operating position. As discussed, the coupler arm 120 and the trailer front arm 115 are substantially aligned along the longitudinal axis 205 of the trailer 100 when the coupler arm 120 is in the operating position. The hinge portion of the trailer front arm 115 and the hinge portion of the coupler arm 120 can have complimenting shapes that do not interfere with one another when the coupler arm is in the operating position. Thus, the trailer knuckles and the coupler knuckles are shaped and positioned such that the knuckles do not scrape or abut one another when the coupler arm 120 is in the operating position or when the coupler arm is moved between the operating position and the stowing position. In this regard, the coupler knuckles and the trailer knuckles can have various shapes and positions on their respective arms that facilitate mating of the front trailer arm 115 and the coupler arm 120.

FIG. 6 shows a top, schematic view of the hitch system 105 with the coupler arm 120 in the stowing position. For clarity of illustration, some structural details of the hitch system 105 have been omitted from FIG. 6. As mentioned, the longitudinal axis of the coupler arm 120 is oriented transverse to the longitudinal axis 205 of the trailer when the coupler arm 120 is in the stowing position. The coupler arm 120 is moved to the stowing position by rotating the coupler arm 120 about an axis of rotation 210 that is defined by a pin that is positioned within the internal shaft axes of the right coupler knuckles 330 and the right trailer knuckle 310, as described in more detail below. Thus, as shown in FIG. 6, the coupler arm 120 rotates toward the side of the trailer front arm 115. It should be appreciated that the orientation and position of the trailer and coupler knuckles can be changed so that the coupler arm 120 rotates in an upward or downward direction when the coupler arm is moved to the stowing position.

Figure 7:
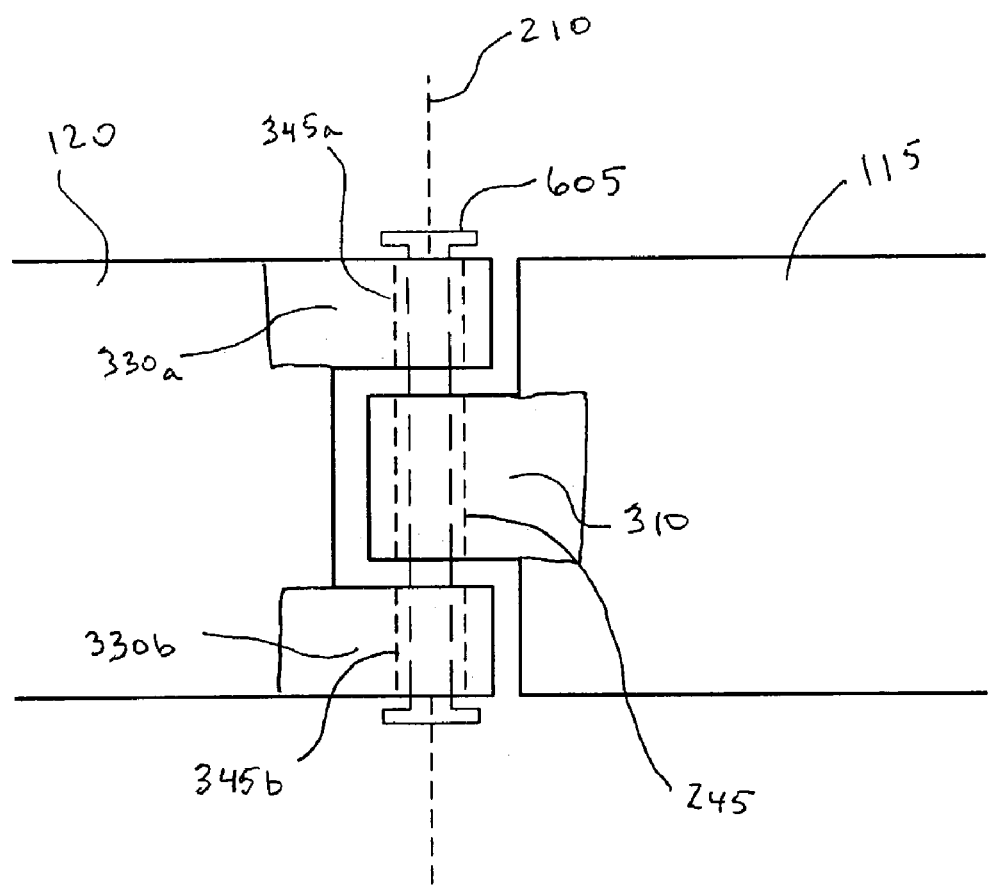
FIG. 7 is a right-side view of a section of the trailer hitch system in an operational state.

FIG. 7 shows a right-side, schematic view of the trailer hitch system 105 with the coupler arm 120 in the operating position. As discussed above, the right trailer knuckle 310 is positioned in the space formed between the right coupler knuckles 330*a*, 330*b*. The internal shafts 345*a*, 345*b*, and 245 are co-axially aligned so that they collectively form a single rotator shaft, in which a rotator pin 605 can be fixedly or removably positioned. The rotator pin 605 has a diameter that is smaller than the diameter of the rotator shaft, in order to permit some play between the pin 605 and the rotator shaft and thereby permit the coupler arm 120 to rotate about the pin 605. In this regard, the pin 605 and the rotator shaft define the axis of rotation 210 about which the coupler arm rotates to transition between the operating position and the stowing position.

Figure 8:
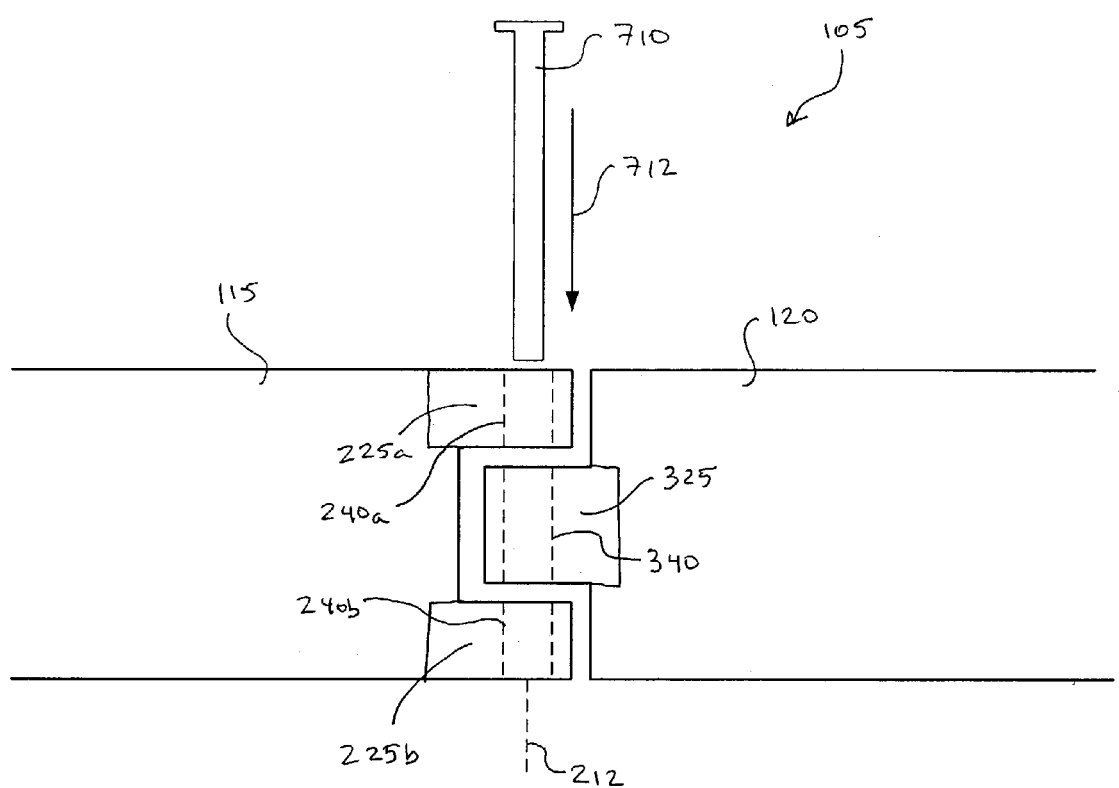
FIG. 8 is a left-side view of a section of the trailer hitch system in an operational state.

FIG. 8 shows a schematic, left-side view of the hitch system 105 with the coupler arm 120 in the operating position. When the coupler arm 120 is in the operating position, the left coupler knuckle 325 is positioned within the space between the left trailer knuckles 225a, 225b. In addition, the internal shaft 340 of the left coupler knuckle 325 co-axially aligns with the internal shafts 240a, 240b of the left trailer knuckles 225a, 225b, such that the shafts collectively form a single detent shaft. A detent pin 710 can be removably inserted into the single detent shaft when the coupler arm 120 is in the operating position, as exhibited by the arrow 712 in FIG. 8. The detent pin 710 has a diameter that is smaller than the diameter of the detent shaft to permit the detent pin 710 to be inserted and removed from the detent shaft without catching on the internal walls of the detent shaft. The respective sizes of the diameters of the detent pin 710 and detent shaft can be varied depending on the amount of play desired between the detent pin 710 and the detent shaft.

With reference to FIG. 8, when the detent pin 710 is positioned into the detent shaft, the detent pin 710 acts as a detent to effectively lock the left coupler knuckle 325 in place with respect to the left trailer knuckles 225a, 225b. Thus, the detent pin 710 can be inserted into the detent shaft to lock the coupler arm 120 in the operating position and prevent the coupler arm 120 from being rotated to the stowing position. The detent pin 710 can then be removed from the detent shaft to permit the left coupler knuckle 325 to move out of the space between the left trailer knuckles 225a, 225b. This will allow the coupler arm to be rotated about the axis of rotation 210 (as exhibited by the rotational arrow 505 in FIG. 6) and moved to the stowing position.

As mentioned, the relative positions of the trailer knuckles and the coupler knuckles can be varied. For example, the trailer front arm 115 can have two left trailer knuckles and a single right trailer knuckle, which mate with the two right coupler knuckles and the single left coupler knuckle on the coupler arm, as was described above with reference to FIGS. 2–8. In other embodiments, the trailer front arm has a single left trailer knuckle and two right trailer knuckles, while the coupler arm has two left coupler knuckles and a single right coupler knuckle. In yet another embodiment, the trailer front arm has two left trailer knuckles and two right trailer knuckles, which mate with a single left coupler knuckle and a single right coupler knuckle on the coupler arm (or vice-versa). The foregoing are merely examples or arrangements of the trailer knuckles and coupler knuckles and it should be appreciated that other arrangements are possible.

Figure 9:
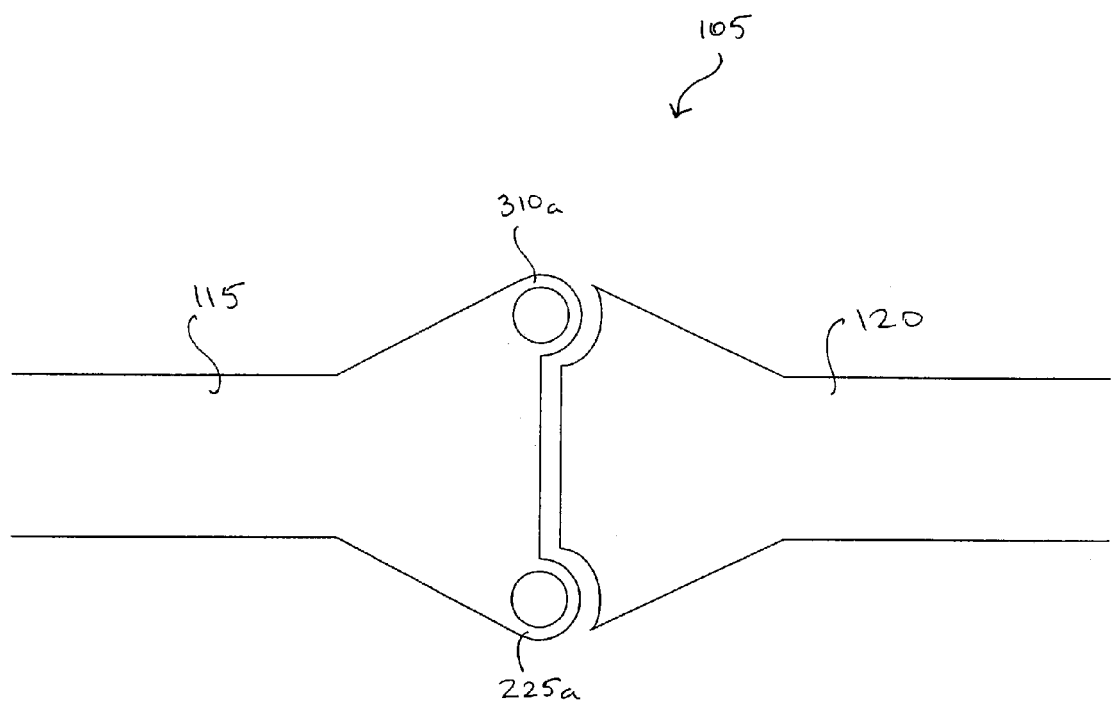
FIG. 9 is a top view of another embodiment of the trailer hitch system.
Figure 10:
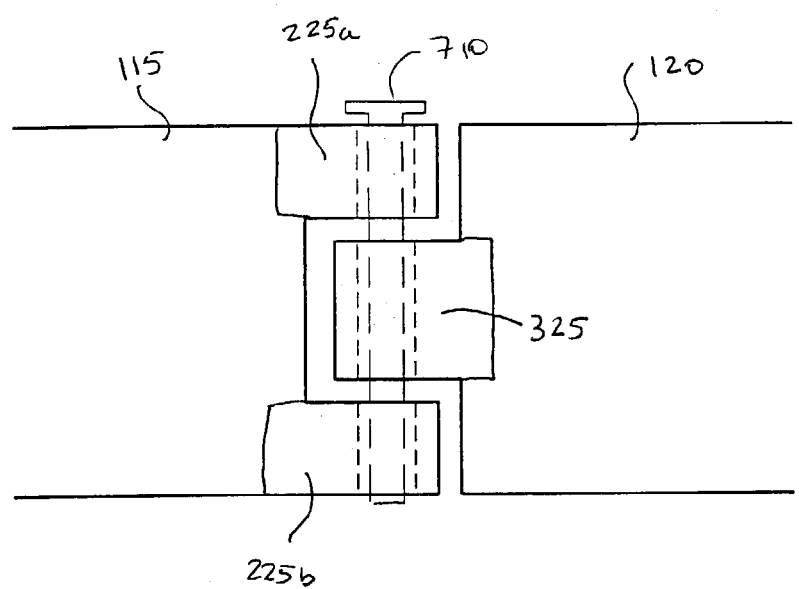
FIG. 10 is a left-side view of a section of the trailer hitch system of FIG. 9.
Figure 11:
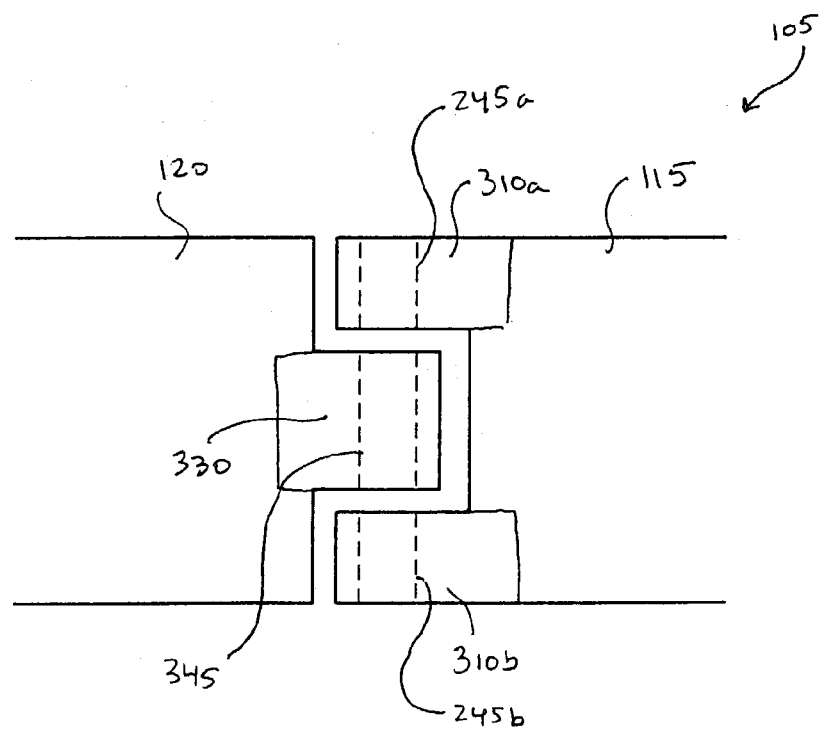
FIG. 11 is a right-side view of a section of the trailer hitch system of FIG. 9.

FIGS. 9–11 show yet another embodiment of the trailer hitch system 105. As in FIGS. 6–8, certain structural details have been omitted for clarity of illustration. As shown in the left-side view of FIG. 10, the trailer front arm 115 has a pair of left trailer knuckles 225a, 225b that are disposed on the top and bottom of the trailer front arm 115. The coupler arm 120 has a central left coupler knuckle 325 that fits between the left trailer knuckles 225a, 225b. As shown in the right-side view of FIG. 11, the trailer front arm 115 also has a pair of right trailer knuckles 310a, 310b (with internal shafts 245a, 245, respectively) that are disposed on the top and bottom of the trailer front arm 115. The coupler arm 120 has a central right coupler knuckle 330 (with internal shaft 345) that fits between the right trailer knuckles 310a, 310b.

FIG. 11 shows the retaining shaft (collectively formed by the internal shafts 245a, 245b and 345) without the rotator pin 605 mounted.

Figure 12:
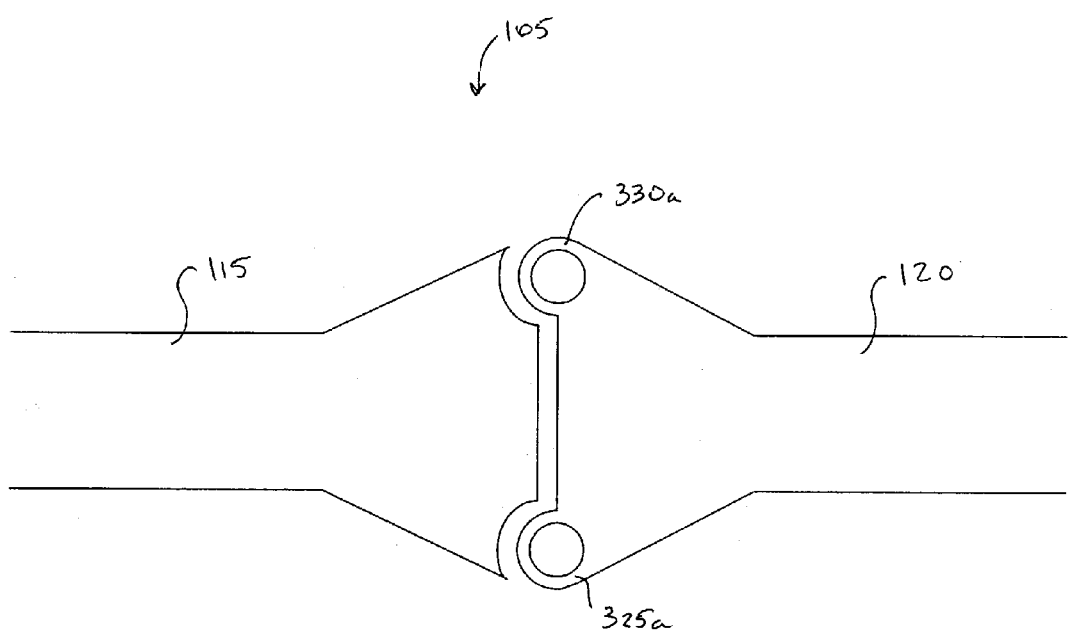
FIG. 12 is a top view of another embodiment of the trailer hitch system.
Figure 13:
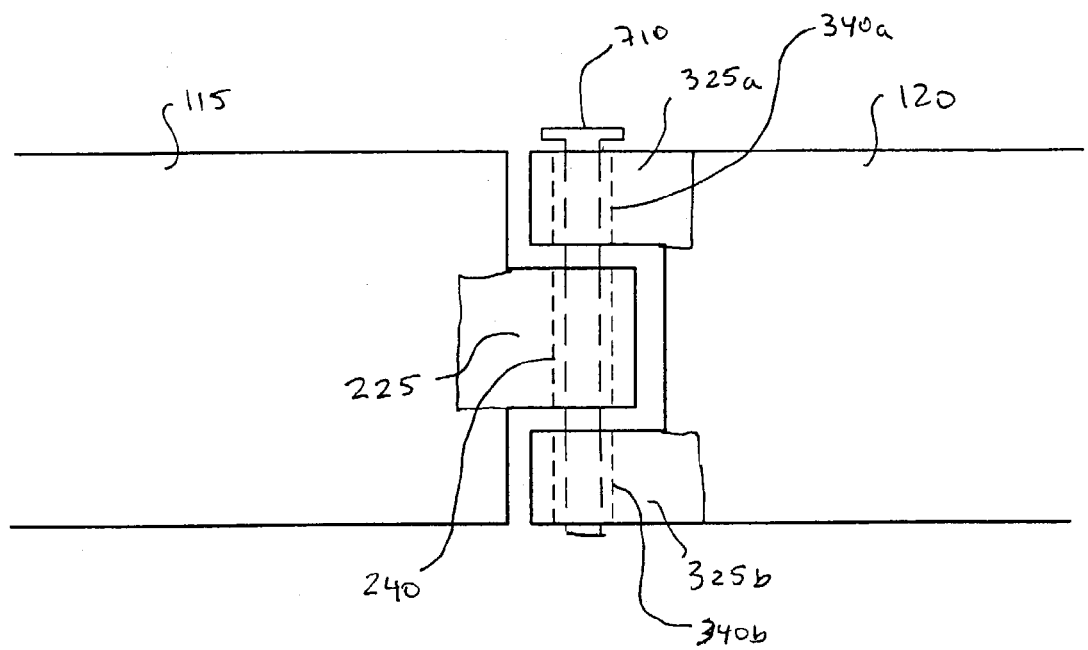
FIG. 13 is a left-side view of a section of the trailer hitch system of FIG. 12.
Figure 14:
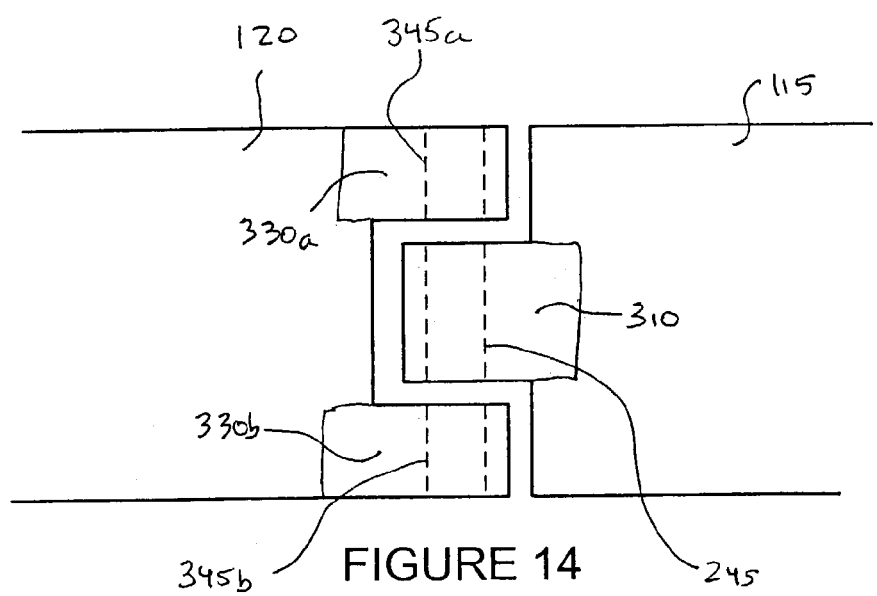
FIG. 14 is a right-side view of a section of the trailer hitch system of FIG. 12.

FIGS. 12–14 show yet another embodiment of the trailer hitch system 105 wherein the respective positions of the trailer knuckles and the coupler knuckles differ from the previous embodiments. As shown in the left-side view of FIG. 13, the coupler arm 120 has a pair of left coupler knuckles 325a, 325b (with internal shafts 340a, 340b, respectively) that are disposed on the top and bottom of the coupler arm 120. The trailer front arm 115 has a central left trailer knuckle 225 (with internal shaft 240) that fits between the left coupler knuckles 325a, 325b. As shown in the right-side view of FIG. 14, the coupler arm 120 also has a pair of right coupler knuckles 330a, 330b that are disposed on the top and bottom of the coupler arm 120. The trailer front arm 115 has a central right coupler knuckle 310 that fits between the right coupler knuckles 325a, 325b.

Figure 15:
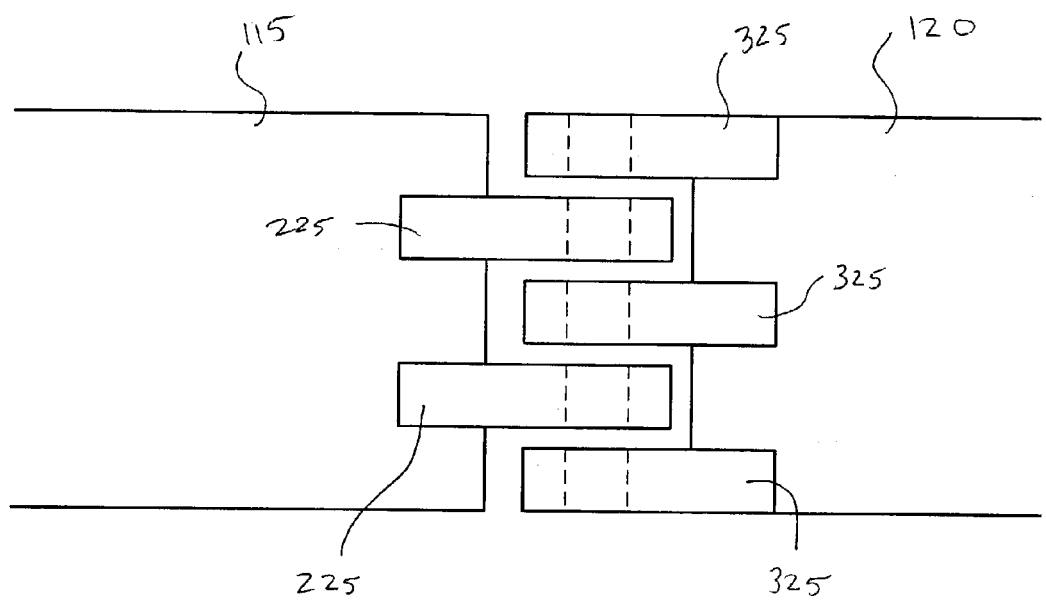
FIG. 15 is a side view of yet another embodiment the trailer hitch system.

FIG. 15 shows a side view of yet another embodiment of the trailer hitch system 105, wherein the trailer front arm 115 includes two or more left trailer knuckles 225 and the coupler arm 120 includes two or more left coupler knuckles 325. The trailer knuckles form a plurality of gaps in which the corresponding coupler knuckles can be positioned when the coupler arm is in the stowing position. The right side of the coupler arm and trailer front arm can have a similar arrangement of knuckles. It should be appreciated that the spatial arrangement and quantity of knuckles is not necessarily symmetric between the left side and right side of the trailer front arm and the coupler arm.

Figure 16:
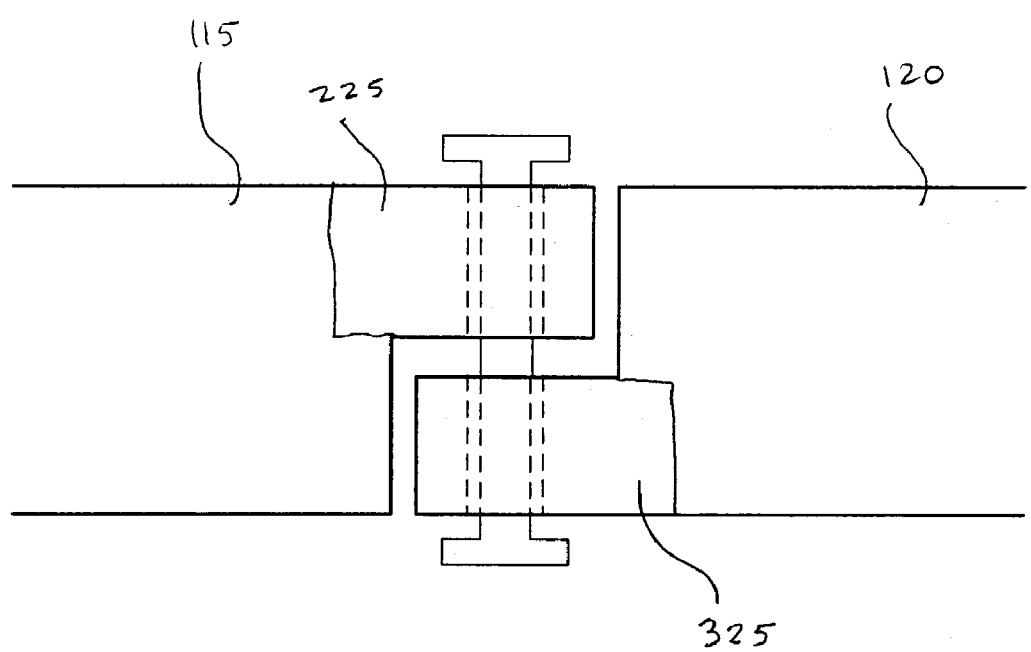
FIG. 16 is a left-side view of yet another embodiment of the trailer hitch system.

FIG. 16 shows a left-side view of yet another embodiment of the trailer hitch system 105, wherein the trailer front arm 115 includes only a single left trailer knuckle 225 and the coupler arm 120 includes only a single left coupler knuckle 325. A single elongate shaft is collectively formed by the respective elongate shafts of the left coupler knuckle and left trailer knuckle, wherein the single shaft can be the rotator shaft or the detent shaft. The right-side view can have a similar knuckle arrangement.

Although embodiments of various methods and devices are described herein in detail with reference to certain versions, it should be appreciated that other versions, embodiments, methods of use, and combinations thereof are also possible. Therefore the spirit and scope of the appended claims should not be limited to the description of the embodiments contained herein.

I claim:

1. A boat trailer, comprising:
 a support section comprising a frame;
 an elongate coupler arm having a front end and a rear end, the front end of the coupler arm configured for attachment to a towing vehicle, wherein at least a first barrel hinge is positioned adjacent a first side of the coupler arm rear end, the first barrel hinge having an elongate, internal shaft;
 an elongate front arm extending forwardly from the support section, wherein at least a second barrel hinge is positioned adjacent a first side of a front end of the front arm, the second barrel hinge having an elongate internal shaft, the first and second barrel hinges having elongate lengths that extend along the axes of their respective internal shafts and being formed by a molding process; and
 wherein the elongate shafts of the first barrel hinge and the second barrel hinge are coaxially-aligned so as to collectively form a single, elongate rotation shaft sized to receive a rotator pin, and wherein the coupler arm can rotate about an axis of the rotation shaft when the rotator pin is positioned in the rotation shaft such that the coupler arm can rotate between (1) an operating position wherein the front arm and the coupler arm extend along a common longitudinal axis, and (2) a stow position wherein the coupler arm is oriented transverse to the front arm.

2. A boat trailer as in claim 1, wherein a third barrel hinge is positioned adjacent the first side of the coupler arm rear end, the third barrel hinge having an elongate, internal shaft axially aligned with the elongate internal shafts of the first and second barrel hinges so that the elongate shafts of the first, second, and third barrel hinges collectively form the single, elongate rotation shaft.

3. A boat trailer as in claim 1, wherein a third barrel hinge is positioned adjacent the first side of the front arm front end, the third barrel hinge having an elongate, internal shaft axially aligned with the elongate internal shafts of the first and second barrel hinges so that the elongate shafts of the first, second, and third barrel hinges collectively form the single, elongate rotation shaft.

4. A boat trailer as in claim 1, further comprising:
a first locking barrel positioned adjacent a second side of the front end of the front arm and a second locking barrel positioned adjacent a second side of the rear end of the coupler arm, wherein the elongate shafts of the first locking barrel and the second locking barrel are coaxially-aligned so as to collectively form a single, elongate lock shaft sized to receive a lock pin, and wherein the coupler arm is locked in the operating position when the lock pin is positioned in the lock shaft.

5. A boat trailer as in claim 1, wherein the first barrel hinge has an annular wall surrounding the first elongate, internal shaft, and wherein at least a portion of the annular wall increases in thickness relative to a remainder of the annular wall to provide increased structural support.

6. A boat trailer as in claim 1, wherein the second barrel hinge has an annular wall surrounding the second elongate, internal shaft, and wherein at least a portion of the annular wall increases in thickness relative to a remainder of the annular wall to provide increased structural support.

7. A boat trailer as in claim 1, wherein the first barrel hinge has an outer wall that slopes toward a side surface of the coupler arm, and wherein the outer wall connects to the first barrel hinge without a weld.

8. A boat trailer as in claim 1, wherein the second barrel hinge has an outer wall that slopes toward a side surface of the front arm, and wherein the outer wall connects to the second barrel hinge without a weld.

9. A trailer hitch system, comprising:
an elongate front arm configured to extend forwardly from a trailer;
at least one molded barrel positioned adjacent a first side of a front end of the front arm and forming a first elongated, internal shaft;
an elongate coupler arm having a front end adapted to be hitched to a towing vehicle and also having a rear end;
at least one molded barrel positioned adjacent a first side of the rear end of the coupler arm and forming a second elongate, internal shaft, wherein the first and second elongated shafts are co-axially aligned to form a common rotation shaft along an axis of rotation; and
wherein the coupler arm can rotate about the axis of rotation when a rotator pin is positioned in the rotation shaft such that the coupler arm can rotate between (1) an operating position wherein the front arm and the coupler arm extend along a common longitudinal axis, and (2) a stow position wherein the coupler arm is oriented transverse to the front arm.

10. A hitch system as in claim 9, wherein the at least one molded barrel adjacent the front arm has an annular wall surrounding the first elongated, internal shaft, and wherein at least a portion of the annular wall increases in thickness relative to a remainder of the annular wall to provide increased structural support.

11. A hitch system as in claim 9, wherein the at least one molded barrel adjacent the coupler arm has an annular wall surrounding the second elongated, internal shaft, and wherein at least a portion of the annular wall increases in thickness relative to a remainder of the annular wall to provide increased structural support.

12. A hitch system as in claim 9, wherein the at least one molded barrel adjacent the front arm has an outer wall that slopes toward a side surface of the front arm, and wherein the outer wall connects to the barrel without a weld.

13. A hitch system as in claim 9, wherein the at least one molded barrel adjacent the coupler arm has an outer wall that slopes toward a side surface of the coupler arm, and wherein the outer wall connects to the barrel without a weld.

14. A hitch system as in claim 9, further comprising one or more additional barrels positioned adjacent the first side of the front end of the front arm, the one or more additional barrels forming additional elongated, internal shafts that are co-axially aligned with the first and second elongated shafts.

15. A hitch system as in claim 9, further comprising one or more additional barrels positioned adjacent the first side of the rear end of the coupler arm, the one or more additional barrels forming additional elongated, internal shafts that are co-axially aligned with the first and second elongated shafts.

* * * * *